(12) United States Patent
Onda et al.

(10) Patent No.: US 8,896,538 B2
(45) Date of Patent: Nov. 25, 2014

(54) INFORMATION PROCESSING DEVICE AND PROGRAM

(75) Inventors: Yasushi Onda, Tokyo (JP); Izua Kano, Tokyo (JP); Dai Kamiya, Tokyo (JP); Keiichi Murakami, Tokyo (JP); Eiju Yamada, Tokyo (JP); Kazuhiro Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1200 days.

(21) Appl. No.: 12/529,061

(22) PCT Filed: Feb. 28, 2008

(86) PCT No.: PCT/JP2008/053471
§ 371 (c)(1),
(2), (4) Date: Feb. 22, 2010

(87) PCT Pub. No.: WO2008/105487
PCT Pub. Date: Sep. 4, 2008

(65) Prior Publication Data
US 2010/0182244 A1 Jul. 22, 2010

(30) Foreign Application Priority Data
Feb. 28, 2007 (JP) ................................. 2007-050249

(51) Int. Cl.
G06F 3/041 (2006.01)
G06G 5/00 (2006.01)
G06F 3/02 (2006.01)
G06F 3/0489 (2013.01)
H04M 1/725 (2006.01)

(52) U.S. Cl.
CPC ......... *G06F 3/0489* (2013.01); *H04M 1/72544* (2013.01); *H04M 1/7258* (2013.01)

USPC ........... 345/168; 345/169; 345/170; 345/171; 345/172; 345/173; 715/790; 715/791; 715/792

(58) Field of Classification Search
None
See application file for complete search history.

(56) References Cited

U.S. PATENT DOCUMENTS

| 6,040,824 A * | 3/2000 | Maekawa et al. .............. 345/173 |
| 2008/0049142 A1* | 2/2008 | Schohn et al. ................ 348/569 |
| 2008/0229237 A1* | 9/2008 | Pagan ........................... 715/797 |

FOREIGN PATENT DOCUMENTS

| EP | 1821177 A1 | 8/2007 |
| JP | 10083271 | 3/1998 |

(Continued)

OTHER PUBLICATIONS

Chinese Office Action for CN App. No. 200880006119.2 dated Jan. 26, 2011 with English translation.

(Continued)

*Primary Examiner* — Stephen Sherman
*Assistant Examiner* — Andre Matthews
(74) *Attorney, Agent, or Firm* — MKG, LLC

(57) ABSTRACT

A mobile phone manages display area 12 as twelve partial areas obtained by dividing the display area into a matrix of four rows and three columns, which is identical to an arrangement of keys of a numeric keypad; if plural windows are displayed in a partial area arranged in the same position as a pressed key, assigns a key to each of the windows displayed in the partial area, the key being for selecting the window, and notifies the keys; and if one of the notified keys is pressed, selects a window to which the pressed key has been assigned.

26 Claims, 10 Drawing Sheets

(56) References Cited

FOREIGN PATENT DOCUMENTS

| JP | 10154060 | 6/1998 |
|---|---|---|
| JP | 2001236180 | 8/2001 |
| JP | 2002297280 | 10/2002 |
| JP | 2004179870 | 6/2004 |
| JP | 2005173087 | 6/2005 |
| JP | 2005175977 | 6/2005 |
| JP | 2005216170 | 8/2005 |
| JP | 2006-148316 A | 6/2006 |
| WO | 01/75667 A1 | 10/2001 |

OTHER PUBLICATIONS

Japanese Office Action dated Jun. 7, 2011 for JP Application Serial No. 2007-050249.

Search Report for corresponding European Application No. 08720966.4, dated Feb. 25, 2013.

Examination Report for corresponding European Application No. 08720966.4, dated Mar. 14, 2013.

* cited by examiner

FIG. 3A

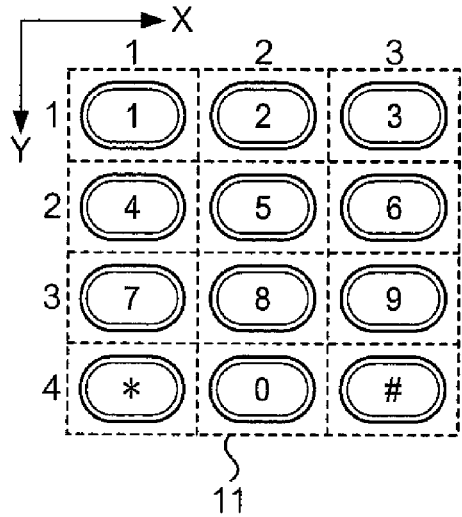
11

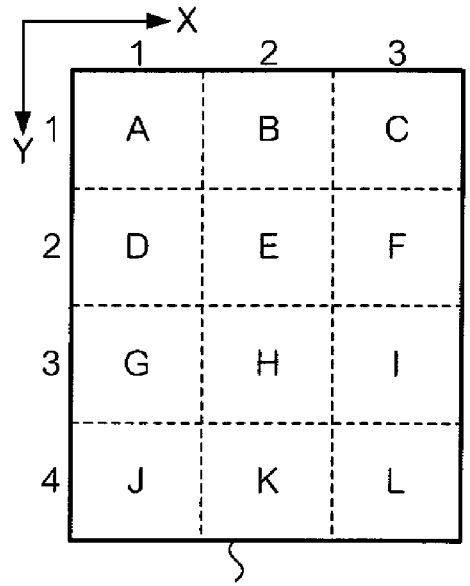
12

FIG. 3B

18a: AREA IDENTIFICATION TABLE

| KEY "1" | AREA DATA OF PARTIAL AREA "A" |
| KEY "2" | AREA DATA OF PARTIAL AREA "B" |
| KEY "3" | AREA DATA OF PARTIAL AREA "C" |
| KEY "4" | AREA DATA OF PARTIAL AREA "D" |
| KEY "5" | AREA DATA OF PARTIAL AREA "E" |
| KEY "6" | AREA DATA OF PARTIAL AREA "F" |
| KEY "7" | AREA DATA OF PARTIAL AREA "G" |
| KEY "8" | AREA DATA OF PARTIAL AREA "H" |
| KEY "9" | AREA DATA OF PARTIAL AREA "I" |
| KEY "*" | AREA DATA OF PARTIAL AREA "J" |
| KEY "0" | AREA DATA OF PARTIAL AREA "K" |
| KEY "#" | AREA DATA OF PARTIAL AREA "L" |

INFORMATION PROCESSING DEVICE AND PROGRAM

TECHNICAL FIELD

The present invention relates to a GUI (Graphical User Interface).

BACKGROUND ART

Mobile phones are not provided with a pointing device such as a mouse or a trackball, because portability is critical to mobile phones. Accordingly, it is difficult to select an icon displayed on a screen of a mobile phone, as compared with a personal computer, which has a pointing device. To address such a problem related to operability, for example, patent document 1 describes displaying plural icons on a screen such that they have the same arrangement as keys of a numeric keypad; activating an icon that is in the same position in an array as a pressed key; and displaying a number of a corresponding key on each icon. Alternatively, patent document 2 describes, as shown in FIG. 4 thereof, assigning to a "tree" object OBJ4 positioned at block B (4, 3) of an image displayed on a mobile phone, which image is divided into a matrix of four rows and three columns in the same way as keys of the phone, a function of starting a game and a key which is arranged at a position corresponding to block B (4, 3), and if the key is pressed, selecting object OBJ4 to start a game. Alternatively, patent document 3 describes dividing an image displayed on an LDC into plural areas arranged in the same way as keys of a numeric keypad, and enlarging an image in an area corresponding to a pressed key.

Patent document 1: JP-A-2004-179870
Patent document 2: JP-A-2005-216170
Patent document 3: JP-A-2005-175977

Based on the inventions described in patent documents 1 to 3, it is possible to conceive of selecting a window from among plural windows displayed on a screen. However, windows are different from icons described in patent document 1 and objects described in patent document 2, in that a size and a position can be freely changed by a user on a screen. Accordingly, if a configuration of displaying plural windows on a screen in the same array as keys of a numeric keypad, as in the case of icons described in patent document 1, is employed, it is necessary to change a size and a position of each window as determined by a user. However, since a size and a position of each window have been arbitrarily determined by a user to make them easy to use, if they are automatically changed, a user has to again change a size and a position of each window in accordance with the user's preference. Also, if a configuration of assigning a key of a numeric keypad to each window in advance, as in the case of objects described in patent document 2, is employed, and if a position or a size of a window is changed, a correlation between positions of windows on a screen and an arrangement of keys of the numeric keypad is lost. As a result, it becomes unclear which key is to be pressed; namely, operability is lowered.

Also, if a configuration of dividing a displayed area into plural areas arranged in the same way as keys of a numeric keypad, and selecting a window displayed in an area corresponding to a pressed key is employed, and if plural windows are displayed in an area corresponding to a pressed key, it is impossible to identify which window is to be selected.

SUMMARY OF THE INVENTION

The present invention has been devised against the above-described background, and is intended to, even if a pointing device is not provided; enable a user to select a desired window among plural windows displayed on a screen, without lowering usability or operability.

The present invention provides as one aspect, an information processing device comprising: a plurality of keys arranged: a storage means for storing for each of partial areas obtained by dividing a display area so that arrangement of the partial areas is identical to arrangement of the plurality of keys, data indicating a range of a partial area and information on a key arranged in a same position as the partial area; an identifying means for, if one of the plurality of keys is operated, identifying a partial area corresponding to the operated key, with reference to the storage means; a determining means for determining whether a plurality of windows are displayed in the partial area identified by the identifying unit; an assigning means for, if it is determined by the determining unit that a plurality of windows are displayed, assigning a key to each of the windows displayed in the partial area identified by the identifying unit, the key being for selecting the window; a notification means for notifying the keys assigned by the assigning means; and a selecting means for, if one of the keys notified by the notification means is operated, selecting a window to which the operated key has been assigned.

According to the above-described aspect, if plural windows are displayed in a partial area arranged in the same position as an operated key, an information processing device assigns a key to each of the windows displayed in the partial area, the key being for selecting the window, and notifies the keys and if one of the notified keys is operated, selects a window to which the pressed key has been assigned.

The present invention also provides in another aspect, an information processing device comprising: a plurality of keys arranged: a storage means for storing for each of partial areas obtained by dividing a display area so that an arrangement of the partial areas is identical to an arrangement of the plurality of keys, data indicating a range of a partial area and information on a key arranged in a same position as the partial area; an identifying means for, if one of the plurality of keys is operated, identifying a partial area corresponding to the operated key, with reference to the storage means; a determining means for determining whether a plurality of windows are displayed in the partial area identified by the identifying unit; a comparing means for, if it is determined by the determining unit that a plurality of windows are displayed, calculating an area of each of the windows displayed in the partial area identified by the identifying unit, and comparing the areas with each other; and a selecting means for selecting a window having a largest area, on the basis of a result of the comparison by the comparing means.

According to this aspect, if plural windows are displayed in a partial area arranged in the same position as an operated key, an information processing device calculates an area of each of the windows displayed in the partial area, compares the areas with each other, and select a window having the largest area.

The present invention also provides in another aspect, an information processing device comprising: a plurality of keys arranged: a storage means for storing for each of partial areas obtained by dividing a display area so that arrangement of the partial areas is identical to arrangement of the plurality of keys, data indicating a range of a partial area and information on a key arranged in a same position as the partial area; a first identifying means for, if one of the plurality of keys is operated, identifying a partial area corresponding to the operated key, with reference to the storage means; a determining means for determining whether a plurality of windows are displayed in the partial area identified by the first identifying unit; a second identifying means for, if it is determined by the determining unit that a plurality of windows are displayed, identifying a plurality of partial areas in which only one of the windows displayed in the partial area identified by the first identifying unit is displayed; a notification means for retrieving information on keys corresponding to the partial areas identified by the second identifying means, from the storage means, and notifying the information; and a selecting means for, if one of the keys notified by the notification means is operated, identifying a partial area corresponding to the operated key with reference to the storage means, and selecting a window displayed in the partial area.

According to this aspect, if plural windows are displayed in a partial area arranged in the same position as an operated key, an information processing device identifies a plurality of partial areas in which only one of the windows displayed in the partial area is displayed; notifies keys corresponding to the identified partial areas; and if one of the notified keys is operated, selects a window displayed in a partial area corresponding to the operated key.

The present invention also provides as another aspect, an information processing device comprising: a plurality of keys arranged: a storage means for storing each of the partial areas obtained by dividing a display area so that arrangement of the partial areas is identical to arrangement of the plurality of keys, data indicating a range of a partial area and information on a key arranged in a same position as the partial area; an identifying means for, if one of the plurality of keys is operated, identifying a partial area corresponding to the operated key, with reference to the storage means; a determining means for determining whether a plurality of windows are displayed in the partial area identified by the identifying unit, and the plurality of windows are displayed in a stack; and a selecting means for, if it is determined by the determining unit that a plurality of windows are displayed in a stack, selecting a window displayed at a forefront among the windows displayed in a stack.

According to the present aspect, if plural windows are displayed in a stack in a partial area arranged in the same position as an operated key, an information processing device selects a window displayed at the forefront among the windows displayed in a stack.

The present invention also provides in another aspect, an information processing device comprising: a plurality of keys arranged: a storage means for storing for each of partial areas obtained by dividing a display area so that arrangement of the partial areas is identical to arrangement of the plurality of keys, data indicating a range of a partial area and information on a key arranged in a same position as the partial area; an identifying means for, if one of the plurality of keys is operated, identifying a partial area corresponding to the operated key, with reference to the storage means; a determining means for determining whether a plurality of windows are displayed in the partial area identified by the identifying unit; and a selecting means for, if it is determined by the determining unit that a plurality of windows are displayed, selecting a window whose title area is included in the partial area among the windows displayed in the partial area identified by the identifying unit.

According to the present aspect, if plural windows are displayed in a partial area arranged in the same position as an operated key, an information processing device selects a window whose title area is included in the partial area among the windows displayed in the partial area.

The information processing device may further comprise a display control means retrieving for each of the partial areas, information on a key corresponding to a partial area, from the storage means, and superimposing the information on an image displayed in the partial area.

The information processing device may further comprise a third identifying means for identifying a partial area in which no window is displayed and a partial area in which only a window with an interaction right is displayed, and the display control means may retrieve for each of the partial areas excluding the partial areas identified by the third identifying means, information on a key corresponding to a partial area, from the storage means, and superimpose the information on an image displayed in the partial area.

The third identifying means may identify a partial area in which no window is displayed, a partial area in which only a window with an interaction right is displayed, and a partial area in which plural windows are displayed.

The information processing device may further comprise a lighting means for illuminating a light for each of the plurality of keys, and the notification means may cause the lighting means to illuminate lights for the keys assigned to the windows by the assigning means, among the plurality of keys.

Alternatively, the information processing device may further comprise a lighting means for illuminating a light for each of the plurality of keys, and the notification means may cause the lighting means to illuminate lights for the keys corresponding to the partial areas identified by the second identifying means, among the plurality of keys.

The present invention also provides in another aspect, a program for causing a computer to execute: an identifying step of, if one of a plurality of keys arranged is operated, identifying, with reference to a memory storing for each of partial areas obtained by dividing a display area so that arrangement of the partial areas is identical to arrangement of the plurality of keys, data indicating a range of a partial area and information on a key arranged in a same position as the partial area, a partial area corresponding to the operated key; a determining step of determining whether a plurality of windows are displayed in the partial area identified at the identifying step; an assigning step of, if it is determined at the determining step that a plurality of windows are displayed, assigning a key to each of the windows displayed in the partial area identified at the identifying step, the key being for selecting the window; a notifying step of notifying the keys assigned at the assigning step; and a selecting step of, if one of the keys notified at the notifying step is operated, selecting a window to which the operated key has been assigned.

The present invention also provides as another aspect, a program for causing a computer to execute: an identifying step of, if one of a plurality of keys arranged is operated, identifying, with reference to a memory storing for each of partial areas obtained by dividing a display area so that arrangement of the partial areas is identical to arrangement of the plurality of keys, data indicating a range of a partial area and information on a key arranged in a same position as the partial area, a partial area corresponding to the operated key; a determining step of determining whether a plurality of windows are displayed in the partial area identified at the identifying step; a comparing step of, if it is determined at the determining step that a plurality of windows are displayed, calculating an area of each of the windows displayed in the partial area identified at the identifying step, and comparing the areas with each other; and a selecting step of selecting a window having a largest area, on the basis of a result of the comparison at the comparing step.

The present invention also provides in another aspect, a program for causing a computer to execute: a first identifying step of, if one of a plurality of keys arranged is operated, identifying, with reference to a memory storing for each of partial areas obtained by dividing a display area so that arrangement of the partial areas is identical to arrangement of the plurality of keys, data indicating a range of a partial area and information on a key arranged in a same position as the partial area, a partial area corresponding to the operated key; a determining step of determining whether a plurality of windows are displayed in the partial area identified at the first identifying step; a second identifying step of, if it is determined at the determining step that a plurality of windows are displayed, identifying a plurality of partial areas in which only one of the windows displayed in the partial area identified at the first identifying step is displayed; a notifying step of retrieving information on keys corresponding to the partial areas identified at the second identifying step, from the memory, and notifying the information; and a selecting step of, if one of the keys notified at the notifying step is operated, identifying a partial area corresponding to the operated key with reference to the memory, and selecting a window displayed in the partial area.

The present invention provides in another aspect, a program for causing a computer to execute: an identifying step of, if one of a plurality of keys arranged is operated, identifying, with reference to a memory storing for each of partial areas obtained by dividing a display area so that arrangement of the partial areas is identical to arrangement of the plurality of keys, data indicating a range of a partial area and information on a key arranged in a same position as the partial area, a partial area corresponding to the operated key; a determining step of determining whether a plurality of windows are displayed in the partial area identified at the identifying step, and the plurality of windows are displayed in a stack; and a selecting step of, if it is determined at the determining step that a plurality of windows are displayed in a stack, selecting a window displayed at a forefront among the windows displayed in a stack.

The present invention provides in another aspect, a program for causing a computer to execute: an identifying step of, if one of a plurality of keys arranged is operated, identifying, with reference to a memory storing for each of partial areas obtained by dividing a display area so that arrangement of the partial areas is identical to arrangement of the plurality of keys, data indicating a range of a partial area and information on a key arranged in a same position as the partial area, a partial area corresponding to the operated key; a determining step of determining whether a plurality of windows are displayed in the partial area identified at the identifying step; a selecting step of, if it is determined at the determining step that a plurality of windows are displayed, selecting a window whose title area is included in the partial area among the windows displayed in the partial area identified at the identifying step.

The present invention enables a user to select a desired window among plural windows displayed on a screen, without lowering usability or operability.

BRIEF DESCRIPTION OF THE DRAWINGS

FIG. 3 is a diagram illustrating a data configuration of an area identification table.

DETAILED DESCRIPTION OF THE PREFERRED EMBODIMENTS

Figure 1:
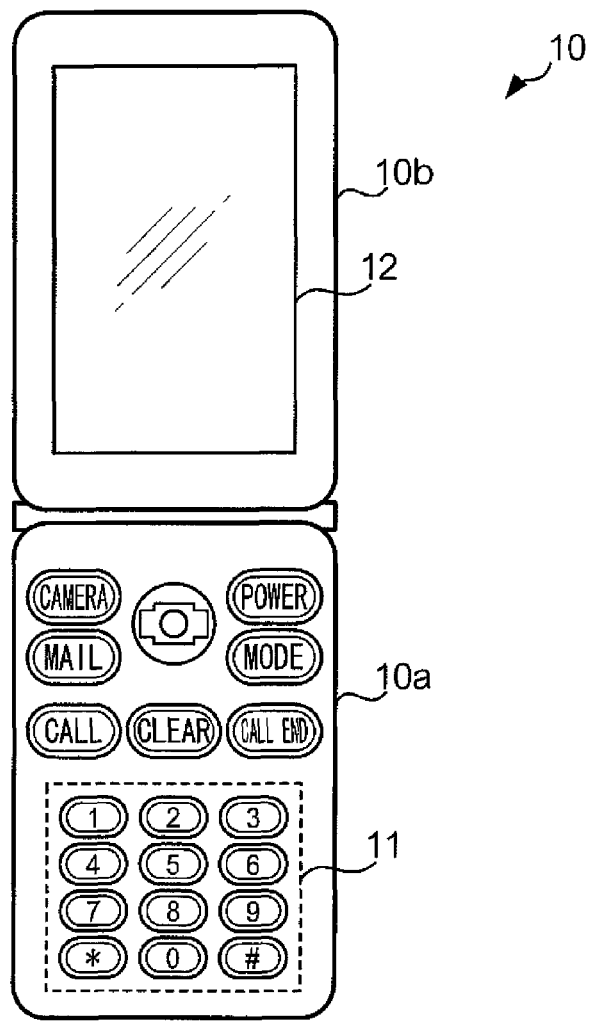
FIG. 1 is an external view of a mobile phone according to an embodiment.

FIG. 1 is an external view of mobile phone 10 according to the present embodiment.

As shown in the drawing, lower portion 10a of mobile phone 10 is provided with numeric keypad 11. Numeric keypad 11 has a total of twelve keys for inputting numbers "0" to "9", and symbols "*" and "#", arranged in a matrix of four rows and three columns. By operating the twelve keys, a user is able to input hiragana characters, katakana characters, alphabetic characters, and pictograms. Lower portion 10a is also provided with keys for ordering calling, clearing, and call ending; a cursor key; a mode switching key; and a power key, in addition to numeric keypad 11. On the other hand, upper portion 10b of mobile phone 10 is provided with display area 12 consisting of a liquid crystal display panel, in which characters and images are displayed.

Figure 2:
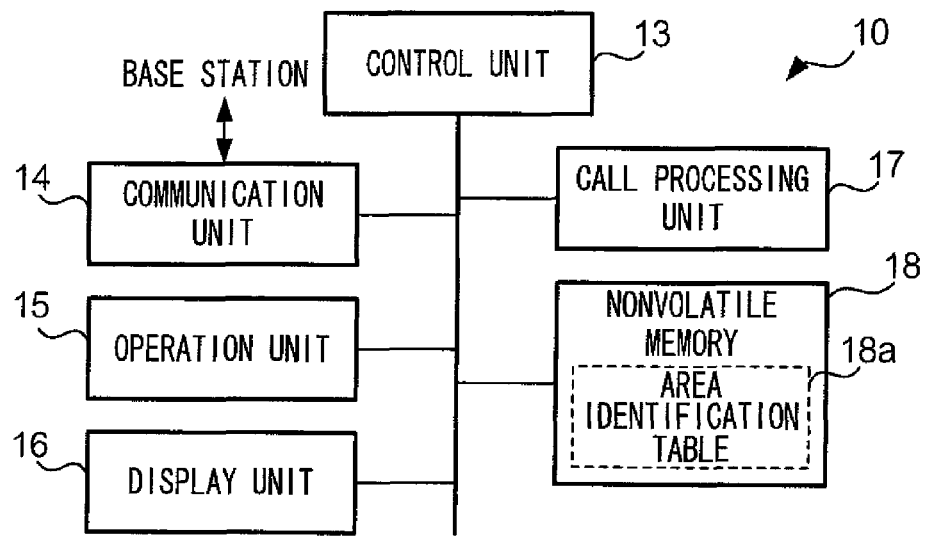
FIG. 2 is a block diagram showing a hardware configuration of the mobile phone of FIG. 1.

FIG. 2 is a block diagram showing a hardware configuration of mobile phone 10. In the drawing, control unit 13 includes a CPU, a ROM, and a RAM that executes programs stored in the ROM or nonvolatile memory 18 to control components of mobile phone 10. Communication unit 14 performs communication with base stations of a mobile phone network or a mobile packet communication network. Operation unit 15 has many keys described above, and outputs an operation signal to control unit 13. Display unit 16 consists of a liquid crystal display panel and a driving circuit of the liquid crystal display panel. Phone call processing unit 17 includes a microphone, a speaker, and a speech processing unit, which perform phone call processing. In nonvolatile memory 18, an operating system (OS) having a GUI function has been installed. According to the GUI function of the OS, display control of windows and switching control of a window with an interaction right (active window) are made.

It is to be noted that many of UNIX (Registered Trademark)-like operating systems do not have a GUI function as a kernel. In a case where an OS does not have a GUI function, a user should install software providing a GUI function, in nonvolatile memory 18, in addition to the OS. The OS installed in nonvolatile memory 18 has a multitasking function for performing plural operations in parallel. In display area 12, different windows are displayed for operations performed in parallel. The switching control of a window with an interaction right described above is an operation of switching a window to which an input from a user received via operation unit 15 is provided (a process associated with running of an OS or application software) from one window to another window displayed in display area 12.

In volatile memory 18, in addition, area identification table 18a is stored. In a case of mobile phone 10, display area 12 is divided into partial areas arranged in a matrix of four rows and three columns, as shown in FIG. 3(*a*), as in the arrangement of the keys of numeric keypad 11, and the resultant twelve partial areas are managed as partial areas "A" to "L". In area identification table 18a, for each key, area data of a partial area arranged in the same position (X, Y) as the key is stored, as shown in FIG. 3(*b*). Area data of a partial area may be composed of coordinate data of the top left corner of the partial area (rectangle) and the bottom right corner of the partial area. In mobile phone 10, by referring to area identification table 18a, a partial area arranged in the same position (X, Y) as a pressed key is identified.

Figure 4:
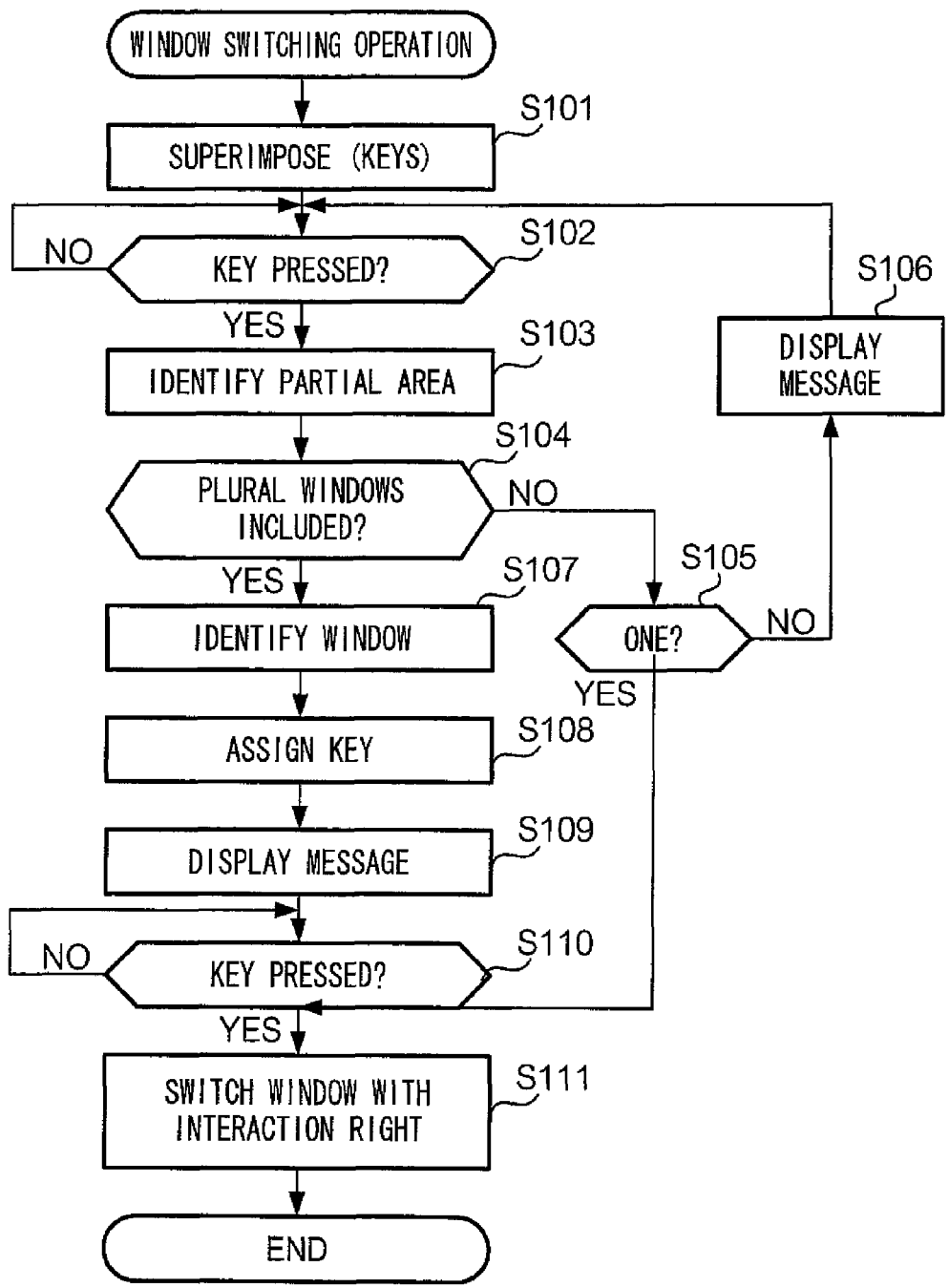
FIG. 4 is a flowchart of a window switching operation performed in a mobile phone in accordance with the present invention.

FIG. 4 is a flowchart of a window switching operation performed in mobile phone 10. Mobile phone 10, while running plural pieces of application software simultaneously using a multitasking function, displays a window for each running application software in display area 12. If plural windows are displayed in display screen 12 in this way, and a mode switching key is pressed to order switching of a window with an interaction right, control unit 13 starts a window switching operation. If the number of windows displayed in display area 12 is two, an interaction right is moved from a window that has had an interaction right to a window that has not had an interaction right, in response to a switching instruction. Accordingly, the window switching operation shown in FIG. 4 is especially effective in a case where the number of windows displayed in display area 12 is three or more.

Figure 5:
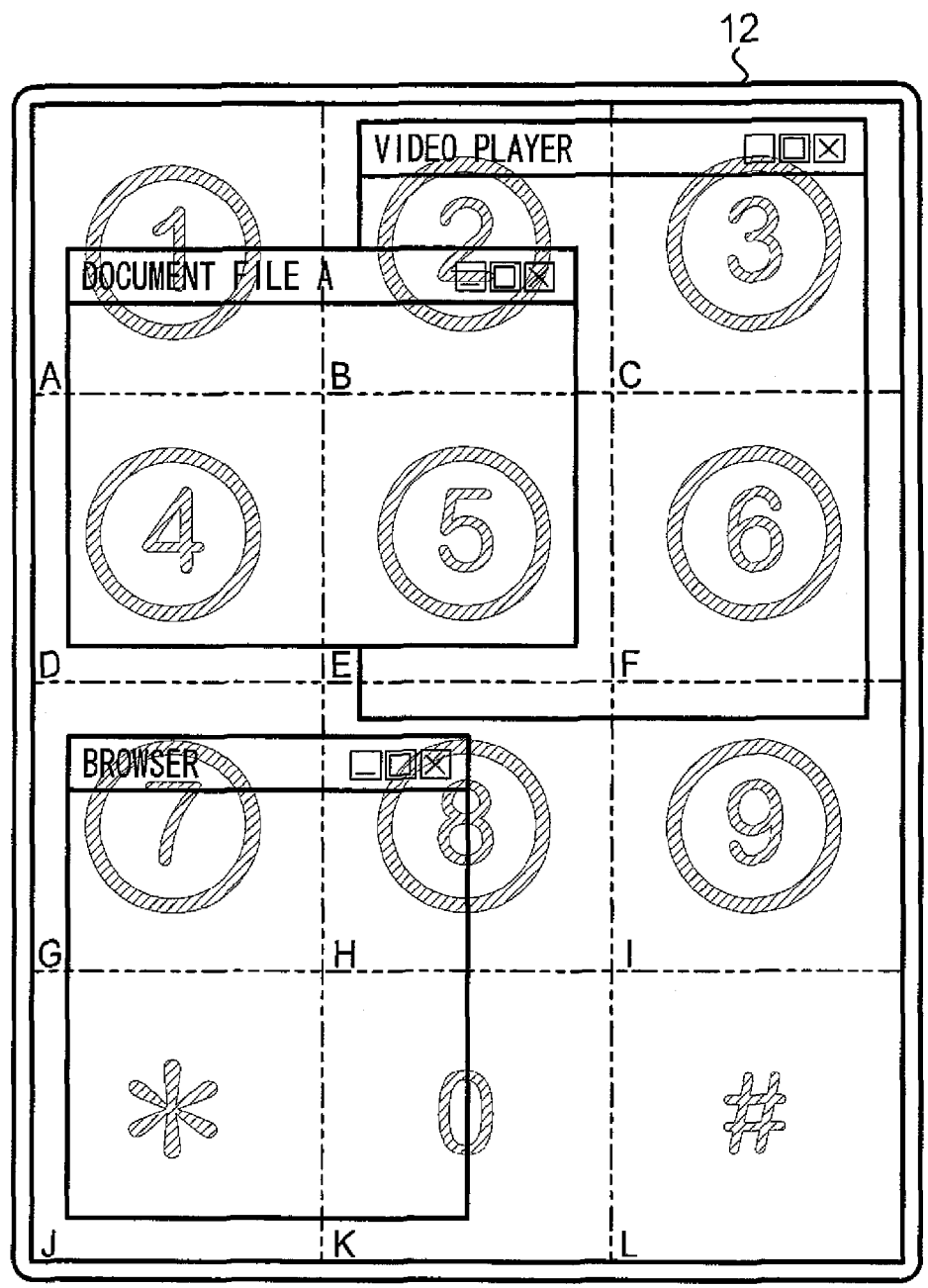
FIG. 5 shows a first example of a screen displayed on a mobile phone in accordance with the present invention.

If the window switching operation is started, control unit 13 initially identifies for each of partial areas "A" to "L", a corresponding key of the numeric keypad, with reference to area identification table 18a. Subsequently, control unit 13 superimposes, for each partial area, an image of a corresponding key of the numeric keypad on a display image displayed in display area 12, as shown in FIG. 5 (step S101). If images of keys of the numeric keypad are superimposed in this way, an error in operation (pressing of a wrong key) by a user, associated with a switching of a window can be reduced.

It is to be noted that in the example of a displayed screen shown in FIG. 5, one of the alphabetic characters "A" to "L" is shown in the bottom left corner of each partial area, for convenience of explanation; however, in an actual screen, alphabetic characters are not displayed. Also, in the example of a displayed screen shown in FIG. 5, a separation line separating partial areas "A" to "L" is shown as a broken line, for convenience of explanation; however, in an actual screen, such a broken line is not shown. However, a separation line may be superimposed together with images of keys of the numeric keypad. Alternatively, since a superimposed display of images of keys of the numeric keypad and a separation line may, if a user is accustomed to switching a window, hinder a user from seeing a displayed content, the necessity of the superimposed display may be determined by a user as required.

Subsequently, control unit 13 determines whether a key of the numeric keypad has been pressed (step S102), and if any of the keys of the numeric keypad has been pressed (step S102: YES), identifies a partial area corresponding to the pressed key, with reference to area identification table 18a (step S103). For example, if key "3" has been pressed, partial area "C" is identified, and if key "0" has been pressed, partial area "K" is identified. At step S103, a partial area arranged in the same position (X, Y) as a pressed key is identified.

Subsequently, control unit 13 determines whether plural windows are displayed in the identified partial area (step S104). In the example of a displayed screen shown in FIG. 5, for example, in partial area "D" corresponding to key "4", only a window for "Document File A" is included. In partial area "G" corresponding to key "7", only a window for "Browser" is included. In partial area "L" corresponding to key "#", no window is included. Accordingly, if any of the keys "4", "7", and "#" has been pressed, a result of the determination at step S104 is "NO".

If a result of the determination at step S104 is "NO", control unit 13 determines whether the number of windows displayed in the partial area identified in step S103 is one (step S105). As a result, if the number of windows is not one (step S105: NO); namely, if no window is displayed in the identified partial area, it means that a wrong key has been pressed. In this case, control unit 13 displays a message informing that an error in operation has been detected, and urges a user to properly re-select a succeeding window, using keys, in display area 12 (step S106), and thereafter returns to step S102. The message may be informed by voice.

For example, if key "#" has been pressed in the example of a displayed screen shown in FIG. 5; since no window is included in partial area "L" corresponding to key "#", a result of the determination at step S105 is "NO". Accordingly, a message is displayed at step S106, and thereafter the operation returns to step S102.

On the other hand, if a result of the determination at step S105 is "YES", control unit 13 proceeds to step S111, at which control unit 13 switches a window with an interaction right to a window displayed in the partial area identified at step S103, and thereafter ends the window switching operation. As a result, thereafter, an input from a user received via operation unit 15 is provided to the window to which an interaction right has been granted at step S111 (a process associated with running of an OS or application software). For example, in the example of a displayed screen shown in FIG. 5, if a window currently having an interaction right is a window for "Document File A," and key "7" is pressed; since only a window for "Browser" is included in partial area "G" corresponding to key "7", a window having an interaction right is switched from the window for "Document File A" to the window for "Browser."

On the other hand, for example, in partial area "E" corresponding to key "5" of the example of a displayed screen shown in FIG. 5, a window for "Document File A" and a window for "Video Player" are included. In partial area "H" corresponding to key "8", a window for "Video Player" and a window for "Browser" are included. Accordingly, if key "5" or "8" is pressed; since plural windows are displayed in the corresponding partial area, a result of the determination at step S104 is "YES".

If a result of the determination at step S104 is "YES", control unit 13 initially identifies windows displayed in the partial area identified at step S103 (step S107). For example, in the example of a displayed screen shown in FIG. 5, if key "8" is pressed, a window for "Video Player" and a window for "Browser" are identified as windows included in corresponding partial area "H". Subsequently, control unit 13 specifies for each of the identified windows, a key of the numeric keypad for selecting the window (step S108). For example, if a window for "Video Player" and a window for "Browser" are identified as described above, control unit 13 specifies key "2" as a key for selecting the window for "Video Player," and key "0" as a key for selecting the window for "Browser." Keys assigned to windows at step 108 may be arbitrarily selected.

A key other than keys of the numeric keypad such as a "call key" or a "call ending key" may be assigned.

Figure 6:
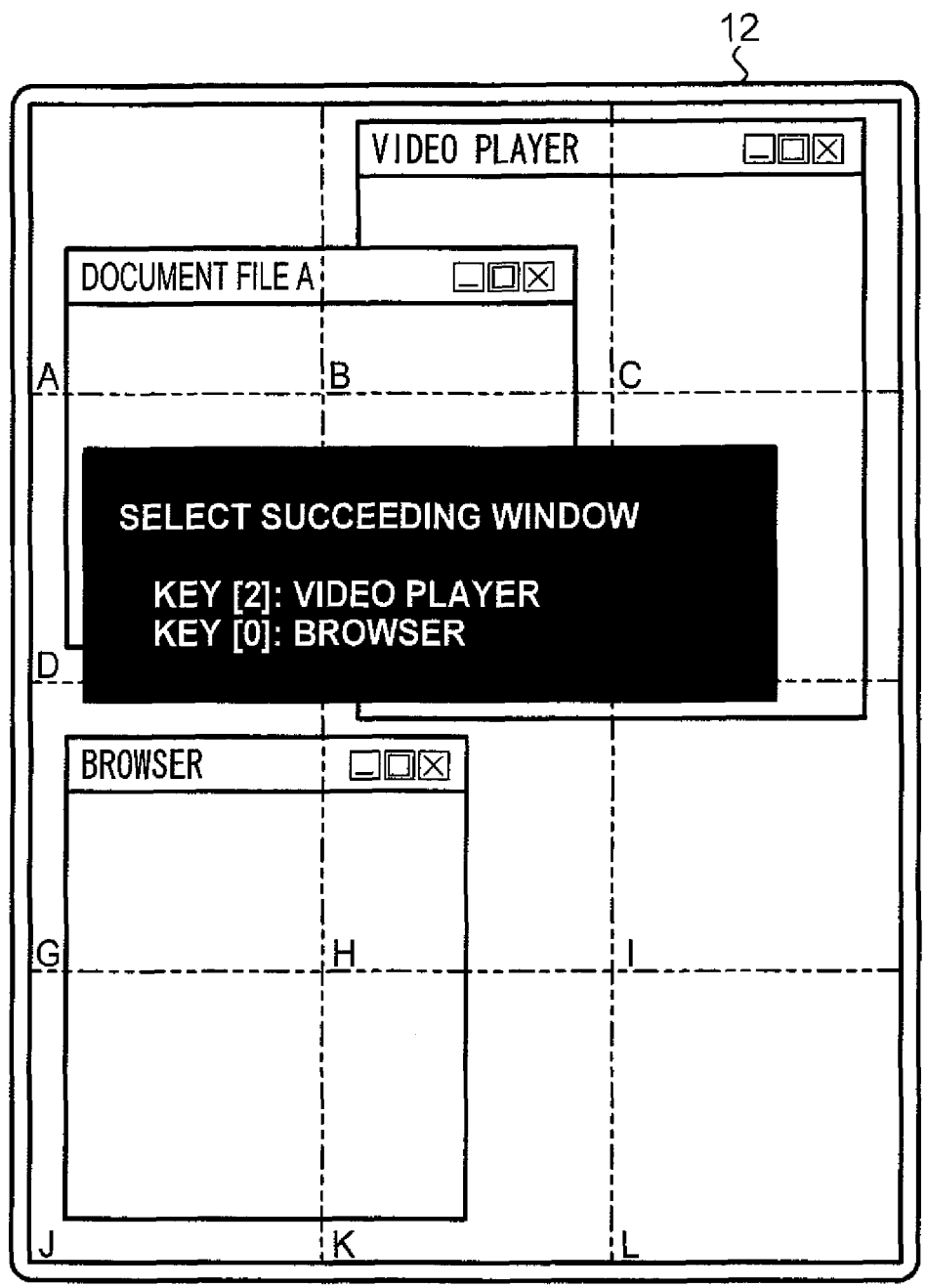
FIG. 6 shows a second example of a screen displayed on a mobile phone in accordance with the present invention.

Subsequently, control unit 13 displays a message including information on the windows identified at step S107 and information on the keys assigned at step S108, and urges a user to select a succeeding window, using the keys being informed, in display area 12, as shown in FIG. 6 (step S109). The message, of course, may be informed by voice. It is to be noted that the images of keys of the numeric keypad superimposed at step S101 are deleted when a message is displayed at step S109, or when a key has been pressed at step S102.

Subsequently, if any of the keys informed to a user at step S109 is pressed (step S110: YES), control unit 13 moves an interaction right to a window to which the pressed key is assigned (step S111), and thereafter ends the window switching operation. For example, in the example of a displayed screen shown in FIG. 5, in a case where a window currently having an interaction right is a window for "Document File A," and key "8" is pressed; in partial area "H" corresponding to key "8", a window for "Video Player" and a window for "Browser" are included. Accordingly, for each of the windows for "Video Player" and "Browser," a key for selecting the window is assigned, and a notification is provided to a user, as shown in the example of a displayed screen shown in FIG. 6. While the example of a displayed screen shown in FIG. 6 is shown, if key "0" is pressed; since the key has been assigned to the window for "Browser," a window having an interaction right is switched from the window for "Document File A" to the window for "Browser."

As explained in the foregoing, according to the present embodiment, mobile phone 10 manages display area 12 as twelve partial areas obtained by dividing the display area into a matrix of four rows and three columns, which is identical to the arrangement of keys of a numeric keypad; if plural windows are displayed in a partial area arranged in the same position (X, Y) as a pressed key, assigns a key to each of the windows displayed in the partial area, the key being for selecting the window, and notifies the keys; and if one of the notified keys is pressed, grants an interaction right to a window to which the pressed key has been assigned. Accordingly, even in a case where plural windows are displayed in a partial area, a user is able to properly select a desired window.

For example, at step S104 of the above window switching operation, if it is determined that plural windows are displayed in a partial area, control unit 13 may calculate a display area included in the partial area for each of the windows, compare the calculated display areas, and grant an interaction right to a window having the largest display area. It is to be noted that a display area to be compared is a display area included in a single partial area, not a display area of a whole window. For example, in the example of a displayed screen shown in FIG. 5, in a case where key "8" is pressed; in partial area "H" corresponding to key "8", a window for "Video Player" and a window for "Browser" are displayed, and a display area included in partial area "H" of the window for "Browser" is larger than that of the window for "Video Player." Accordingly, in this case, an interaction right is granted to the window for "Browser."

In the case where key "8" is pressed while the example of a displayed screen shown in FIG. 5 is shown, a user is aware that two windows are included in partial area "H" corresponding to key "8", and that since the percentage of the window for "Browser" is larger, the window for "Browser" will be selected. Therefore, according to the configuration of comparing areas of windows displayed in a partial area; even in a case where plural windows are displayed in a partial area, a user is able to select a desired window. Also, as compared with the configuration of the above embodiment, it is unnecessary to assign selection keys and make an inquiry to a user; accordingly, an operation is simplified.

Figure 11:
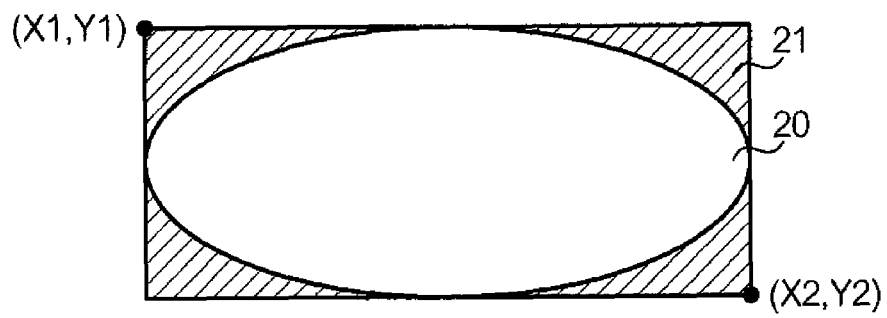
FIG. 11 is a diagram illustrating an area of a window displayed according to an embodiment of the present invention.

If as shown in FIG. 11, the shape of window 20 is ellipsoidal; in the area of a rectangle identified by coordinate data of the top left corner (X1,Y1) and coordinate data of the bottom right corner (X2,Y2), transparent area 21 marked with diagonal lines is not included in an area displayed of window 20, since transparent area 21 is transparent. Accordingly, transparent area 21 may be excluded from an area displayed of window 20, when calculating the area displayed of window 20.

Alternatively, at step S104 of the above window switching operation, if it is determined that plural windows are displayed in a partial area, control unit 13 may identify the windows displayed in the partial area; check if there are partial areas in which only one of the identified windows is displayed; if such partial areas exist, superimpose an image of a corresponding key in the partial areas; and urge a user to select a succeeding window. Namely, if a partial area in which plural windows are displayed is selected, that selection may be ignored, and a user may be urged to re-select a proper key.

For example, in the example of a displayed screen shown in FIG. 5, in a case where key "8" is pressed; in partial area "H" corresponding to key "8", a window for "Video Player" and a window for "Browser" are displayed. In this case, control unit 13 examines partial areas "A" to "L" to identify as a partial area in which only the window for "Video Player" is displayed, partial areas "C", "F", and "I", and identify as a partial area in which only the window for "Browser" is displayed, partial areas "G", "J", and "K".

Figure 7:
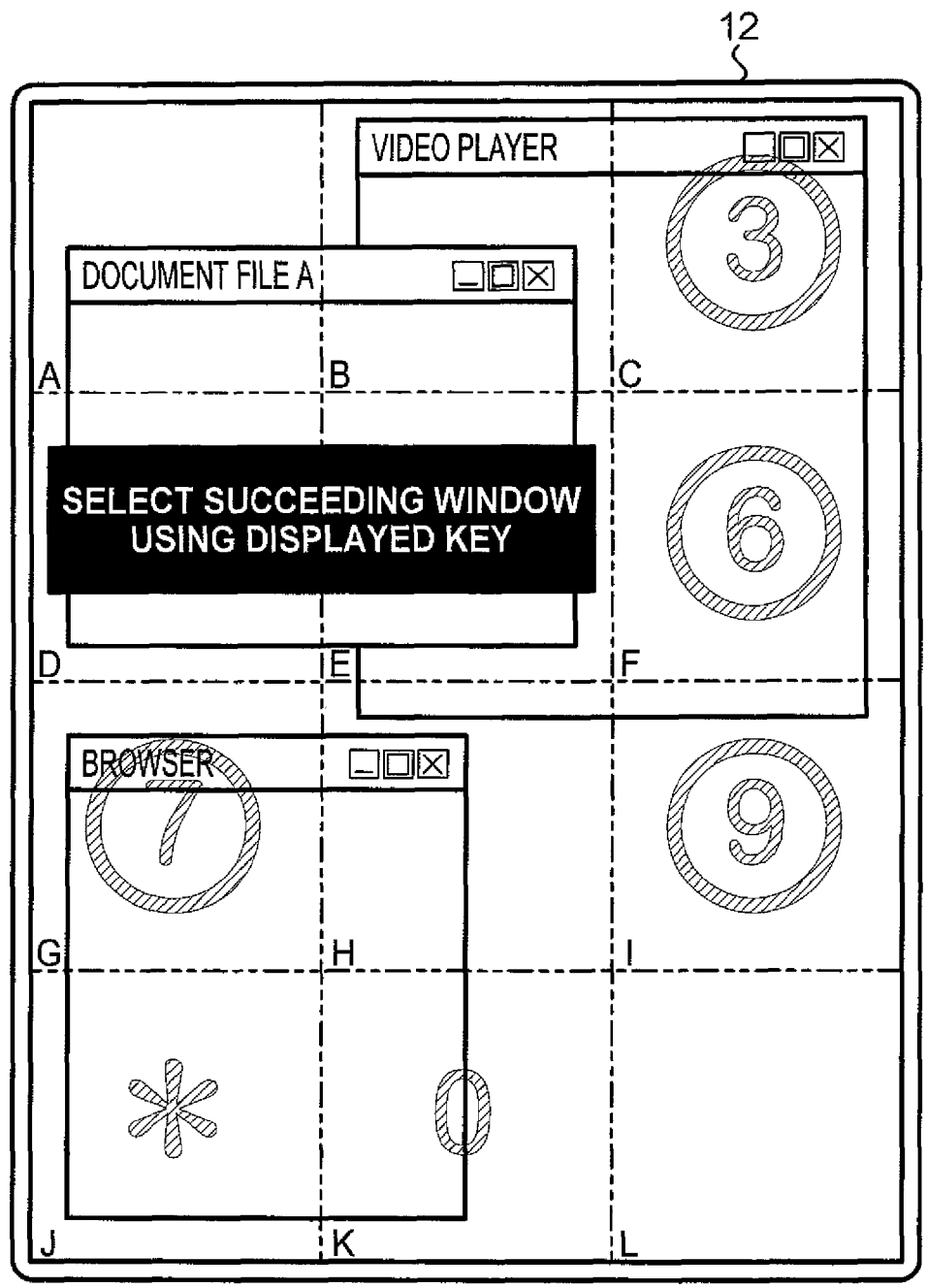
FIG. 7 shows an example of a screen displayed according to an embodiment of the present invention.

Subsequently, control unit 13 superimposes in only partial areas "C", "F", and "I" in which only the window for "Video Player" is displayed, and partial areas "G", "J", and "K" in which only the window for "Browser" is displayed, images of corresponding keys, as shown in FIG. 7, and urges a user to select a succeeding window by pressing one of the displayed keys. After that, if one of keys "3", "6", and "9" is pressed while the example of a displayed screen shown in FIG. 5 is shown, control unit 13 grants an interaction right to the window for "Video Player," and if one of keys "7", "*", and "0" is pressed, control unit 13 grants an interaction right to the window for "Browser."

Figure 8:
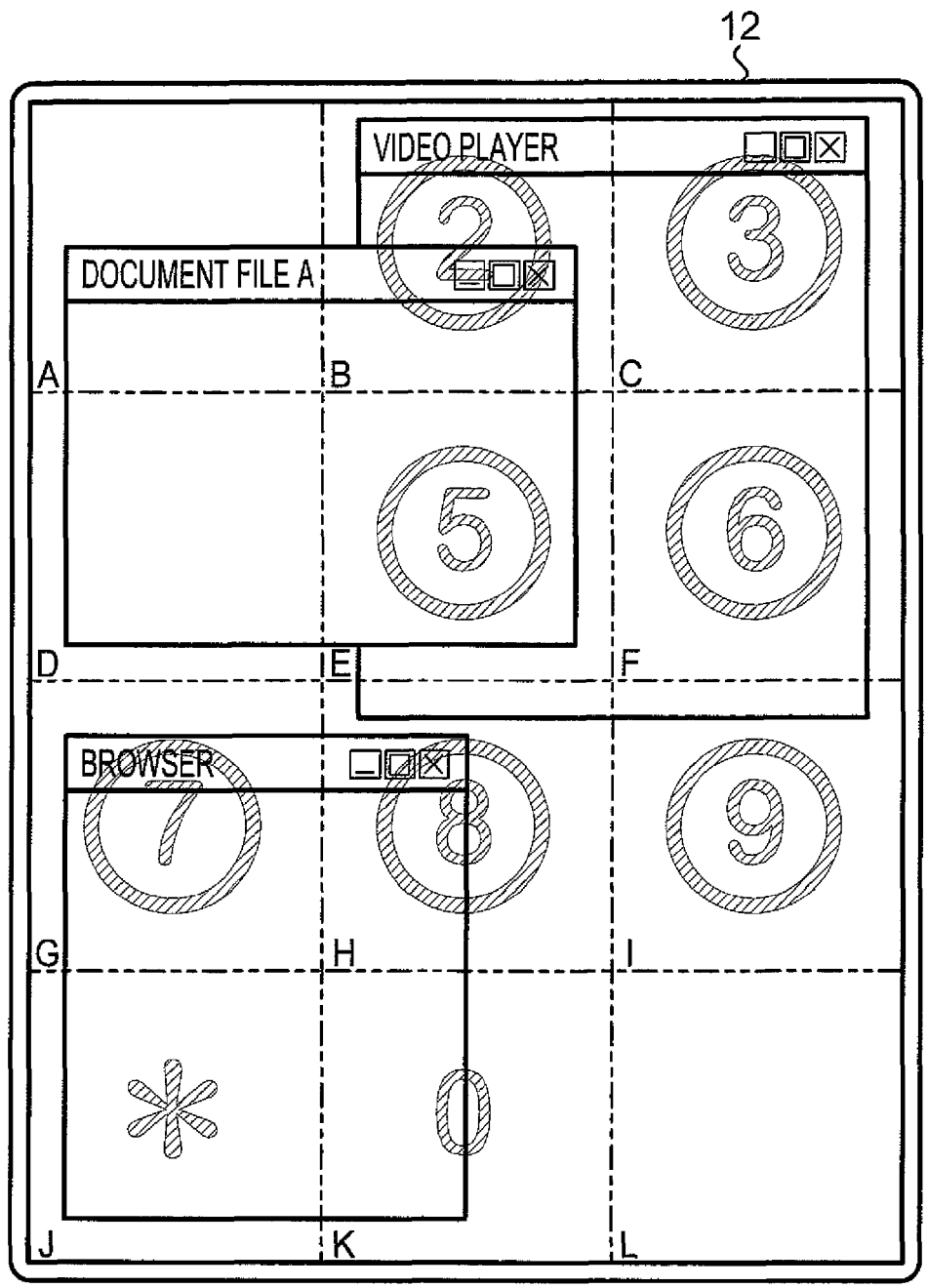
FIG. 8 shows an example of a screen displayed according to an embodiment of the present invention.

For example, as shown in FIG. 8, in partial area "#" in which no window is displayed, and partial areas "A" and "D" in which only a window for "Document File A," which currently has an interaction right is displayed; since no candidate for a window to which an interaction right is granted is included, no image of a key may be superimposed. In this case, control unit 13, when superimposing images of keys at step S101, examines partial areas "A" to "L" to identify a partial area in which no window is displayed and a partial area in which only a window having an interaction right is displayed, and superimposes images of keys in partial areas other than the identified partial areas. It is to be noted that in this case, only an operation using a key whose image is superimposed may be enabled, and an operation using a key whose image is not superimposed may be disabled.

Figure 9:
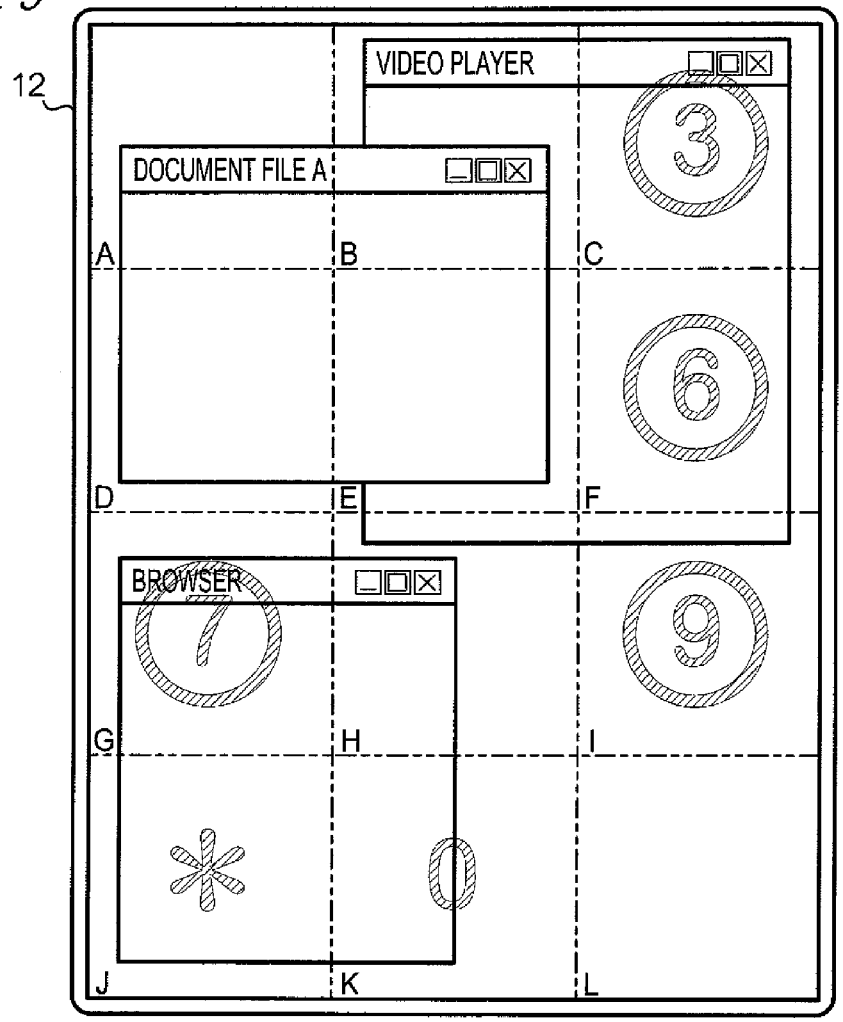
FIG. 9 shows an example of a screen displayed according to an embodiment of the present invention.

Alternatively, as shown in FIG. 9, not only in partial area "#" in which no window is displayed and partial areas "A" and "D" in which only a window for "Document File A," which currently has an interaction right is displayed, but also in partial areas "B", "E", and "H" in which plural windows are displayed, no image of a key may be superimposed. In this case, control unit 13, when superimposing images of keys at step S101, examines partial areas "A" to "L" to identify not only a partial area in which no window is displayed and a partial area in which only a window having an interaction right is displayed, but also a partial area in which plural windows are displayed, and superimposes images of keys in partial areas other than the identified partial areas. Of course, even in this case, only an operation using a key whose image is superimposed may be enabled, and an operation using a key whose image is not superimposed may be disabled. As explained in the foregoing, a partial area in which plural windows are displayed may be previously ruled out as a selectable candidate.

Figure 12:
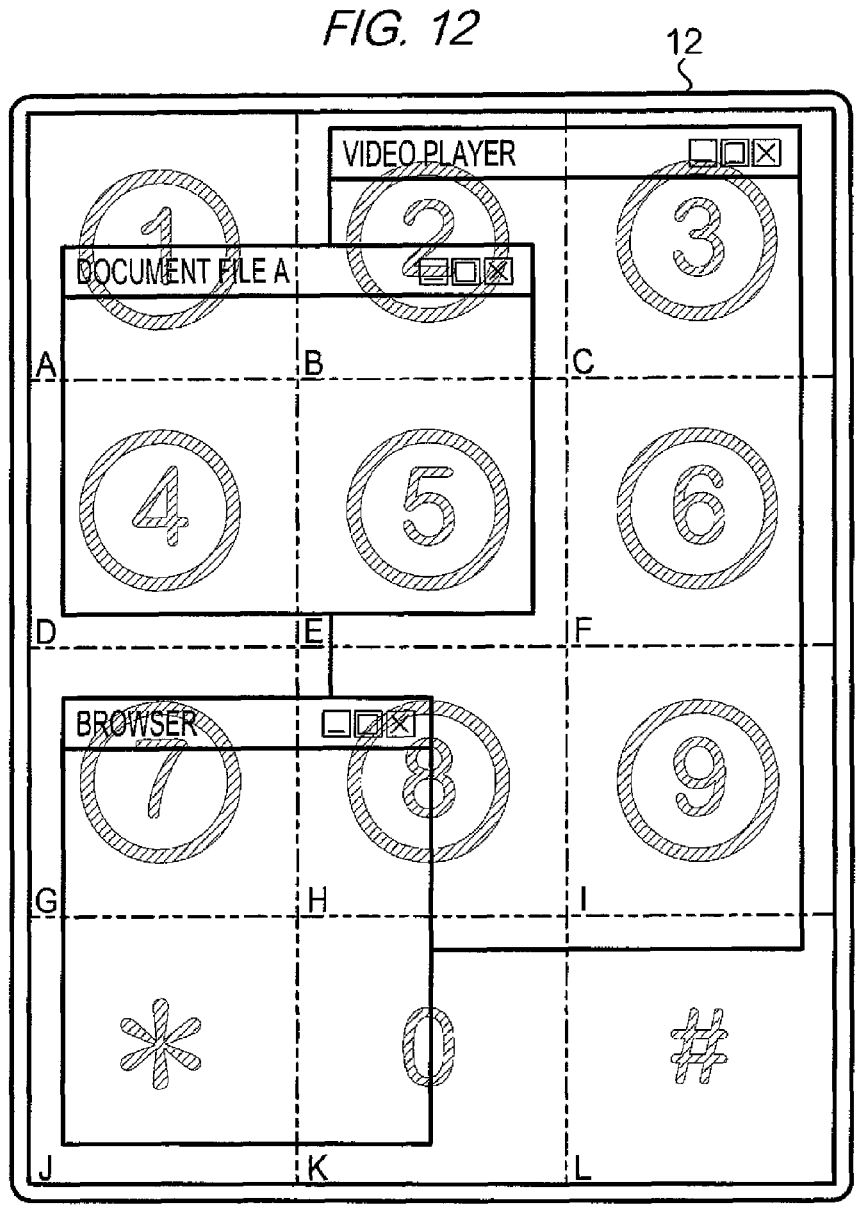
FIG. 12 shows an example of a screen displayed according to an embodiment of the present invention.

Alternatively, at step S104 of the above windows switching operation, if it is determined that plural windows are displayed in a partial area, control unit 13 may further determine whether the plural windows are displayed in a stack; as a result, if the plural windows are displayed in a stack, identify a window displayed at the forefront among them; and grant an interaction right to the window. For example, in a case where key "8" is pressed while an example of a displayed screen shown in FIG. 12 is shown; in partial area "H" corresponding to key "8", a window for "Video Player" and a window for "Browser" are displayed in a stack, and the window for "Browser" is displayed at the forefront. Accordingly, in this case, an interaction right is granted to the window for "Browser."

Figure 13:
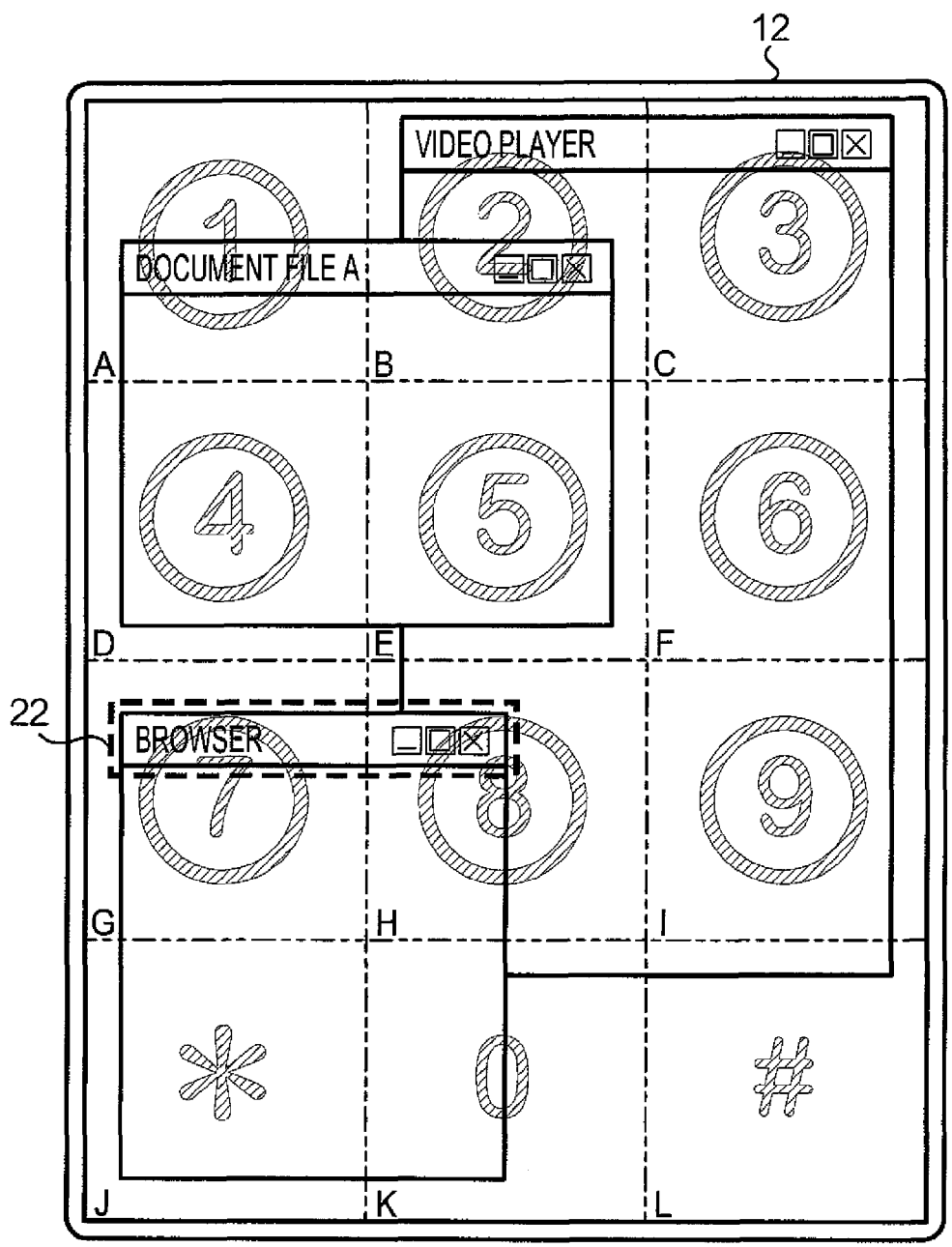
FIG. 13 shows an example of a screen displayed according to an embodiment of the present invention.

At step S104 of the above window switching operation, if it is determined that plural windows are displayed in a partial area, control unit 13 may select among windows displayed in the partial area, a window whose title area is included in the partial area, and grant an interaction right to the window. A title area is an area in which title information for identifying and outlining a window such as a file name like "Document File A" or an application name like "Video Player" or "Browser" is displayed. For example, in a case where key "8" is pressed while an example of a displayed screen shown in FIG. 13 is shown; in partial area "H" corresponding to key "8", a window for "Video Player" and a window for "Browser" are displayed, and a window having title area 22 included in partial area "H" is the window for "Browser." Accordingly, an interaction right is granted to the window for "Browser."

For example, a backlight may be provided beneath numeric keypad 11, capable of illuminating a light for each key, and at step S109 of the window switching operation described above, in a case where plural windows are displayed in a partial area selected by a user, lights may be illuminated for keys assigned to the windows included in the partial area. For example, in a case where key "8" is pressed while the example of a displayed screen shown in FIG. 5 is shown; in a corresponding partial area "H", a window for "Video Player" and a window for "Browser" are displayed. In this case, control unit 13 causes a backlight to illuminate a light for key "2" assigned to the window for "Video Player" and a light for key "0" assigned to the window for "Browser." When the lights are illuminated, a message for urging a user to select a succeeding window using a lighting key is displayed on the screen. It is to be noted that the lighting control of keys may be performed in addition to displaying of a message shown in FIG. 6. Also, in the above modifications (2) to (4), instead of superimposing an image of a key, a light for the key may be illuminated. Alternatively, in addition to superimposing of an image of a key, a light for the key may be illuminated.

In the above embodiment, where it is described that an interaction right is moved to a newly selected window; if plural windows are displayed in a stack, a window to which an interaction right has been moved may be displayed at the forefront. Alternatively, it may be possible that a newly selected window is displayed at the forefront; however, an interaction right is not moved from a window currently having the right. Alternatively, it may be possible that just selection of a window is made, without moving an interaction right or changing a display order. However, in this case, it is necessary to blink a finally-selected window or display the window in a different color so that a user is able to identify the selected window.

Figure 10:
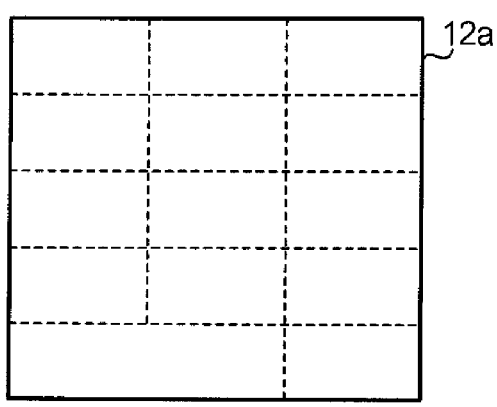
FIG. 10 shows a modification of an arrangement of keys of a numeric keypad and partial areas.

Arrangement of keys of numeric keypad 11 and arrangement of partial areas in display area 12 are not limited to the array of four rows and three columns. They may be, for example, five rows and three columns, two rows and two columns, or three rows and one column. Alternatively, numeric keypad 11 and display area 12 may be numeric keypad 11a and display area 12a, respectively, having an arrangement shown in FIG. 10. Alternatively, keys of numeric keypad 11 and partial areas do not have to be arranged in a matrix. Alternatively, other than keys of numeric keypad 11, keys for inputting hiragana characters, katakana characters, or alphabetic characters may be used.

Mobile phone 10 (computer) performs an operation according to the present invention such as the window switching operation (see FIG. 4), by running an OS (program) installed in nonvolatile memory 18. The program may be provided to mobile phone 10 by communication. Alternatively, the programs may be provided to mobile phone 10 via a recording medium such as a magnetic disk, a flexible disk, or an optical recording medium. Also, the above embodiment describes a case in which the present invention is applied to a mobile phone; however, the present invention can be applied to not only a mobile phone, but also an information processing device such as a PHS (Registered Trademark) terminal, a wireless communication terminal included in a public wireless LAN, a personal computer, a PDA, or an electronic organizer. Also, it is possible that an information processing device does not include a display means, as is clear from the existence of an embodiment in which a computer is used together with a monitor device (display device) connected to the computer. Also, a communication function is not essential for an information processing device. Also, in the above embodiment where control unit 13 carries out operations of identifying a partial area, determining whether a window is displayed or not, and assigning a key, hardware dedicated to the operations may be implemented. An embodiment of implementation of hardware or software for realizing functions of the present invention is not limited to the one shown in FIG. 2.

What is claimed is:

1. An information processing device comprising:
a plurality of arranged keys;
a storage means for storing for each of partial areas obtained by dividing a display area so that arrangement of the partial areas is substantially identical to arrangement of the plurality of arranged keys, data indicating a range of a partial area and information on a key arranged in a substantially same position as the partial area;
an identifying means for, if one of the plurality of arranged keys is operated, identifying a partial area corresponding to the operated key, with reference to the storage means;
a determining means for determining whether a plurality of windows are displayed in the partial area identified by the identifying means;
an assigning means for, if it is determined by the determining means that a plurality of windows are displayed, assigning a key to each of the windows displayed in the partial area identified by the identifying means, the key being for selecting the window;

a notification means for notifying the keys assigned by the assigning means; and a selecting means for, if one of the keys notified by the notification means is operated, selecting a window to which the operated key has been assigned, wherein when the assigning means assigns a key to each of the windows displayed in the partial area identified by the identifying means, the assigned key is different from the key corresponding to the partial area identified by the identifying means.

2. An information processing device comprising:

a plurality of arranged keys;

a storage means for storing for each of partial areas obtained by dividing a display area so that arrangement of the partial areas is substantially identical to arrangement of the plurality of arranged keys, data indicating a range of a partial area and information on a key arranged in a same position as the partial area;

an identifying means for, if one of the plurality of arranged keys is operated, identifying a partial area corresponding to the operated key, with reference to the storage means;

a determining means for determining whether a plurality of windows are displayed in the partial area identified by the identifying means;

a comparing means for, if it is determined by the determining means that a plurality of windows are displayed, calculating an area of each of the windows displayed in the partial area identified by the identifying means, and comparing the areas with each other;

a selecting means for selecting a window having a largest area, on the basis of a result of the comparison by the comparing means; and a message providing means for, when no window is displayed in the partial area identified by the identifying means, providing a user with a message informing that an error in operation has been detected, and urging the user to re-select one of the plurality of keys.

3. An information processing device comprising:

a plurality of arranged keys;

a storage means for storing for each of partial areas obtained by dividing a display area so that arrangement of the partial areas is identical to arrangement of the plurality of arranged keys, data indicating a range of a partial area and information on a key arranged in a same position as the partial area;

a first identifying means for, if one of the plurality of arranged keys is operated, identifying a partial area corresponding to the operated key, with reference to the storage means;

a determining means for determining whether a plurality of windows are displayed in the partial area identified by the first identifying means;

a second identifying means for, if it is determined by the determining means that a plurality of windows are displayed, identifying a plurality of partial areas in which only one of the windows displayed in the partial area identified by the first identifying means is displayed;

a notification means for retrieving information on keys corresponding to the partial areas identified by the second identifying means, from the storage means, and notifying the information;

a selecting means for, if one of the keys notified by the notification means is operated, identifying a partial area corresponding to the operated key with reference to the storage means, and selecting a window displayed in the partial area; and a message providing means for, when no window is displayed in the partial area identified by the first identifying means, providing a user with a message informing that an error in operation has been detected, and urging the user to re-select one of the plurality of keys.

4. An information processing device comprising:

a plurality of arranged keys;

a storage means for storing for each of partial areas obtained by dividing a display area so that arrangement of the partial areas is identical to arrangement of the plurality of arranged keys, data indicating a range of a partial area and information on a key arranged in a same position as the partial area;

an identifying means for, if one of the plurality of arranged keys is operated, identifying a partial area corresponding to the operated key, with reference to the storage means;

a determining means for determining whether a plurality of windows are displayed in the partial area identified by the identifying means, and the plurality of windows are displayed in a stack;

a selecting means for, if it is determined by the determining means that a plurality of windows are displayed in a stack, selecting a window displayed at a forefront among the windows displayed in the partial area in a stack; and a message providing means for, when no window is displayed in the partial area identified by the identifying means, providing a user with a message informing that an error in operation has been detected, and urging the user to re-select one of the plurality of keys.

5. An information processing device comprising:

a plurality of arranged keys;

a storage means for storing for each of partial areas obtained by dividing a display area so that arrangement of the partial areas is identical to arrangement of the plurality of arranged keys, data indicating a range of a partial area and information on a key arranged in a same position as the partial area;

an identifying means for, if one of the plurality of keys is operated, identifying a partial area corresponding to the operated key, with reference to the storage means;

a determining means for determining whether a plurality of windows are displayed in the partial area identified by the identifying means;

a selecting means for, if it is determined by the determining means that a plurality of windows are displayed, selecting a window whose title area is included in the partial area among the windows displayed in the partial area identified by the identifying means; and a message providing means for, when no window is displayed in the partial area identified by the identifying means, providing a user with a message informing that an error in operation has been detected, and urging the user to re-select one of the plurality of keys.

6. An information processing device according to claim 1, further comprising a display control means retrieving for each of the partial areas, information on a key corresponding to a partial area, from the storage means, and superimposing the information on an image displayed in the partial area.

7. An information processing device according to claim 2, further comprising a display control means retrieving for each of the partial areas, information on a key corresponding to a partial area, from the storage means, and superimposing the information on an image displayed in the partial area.

8. An information processing device according to claim 3, further comprising a display control means retrieving for each of the partial areas, information on a key corresponding to a partial area, from the storage means, and superimposing the information on an image displayed in the partial area.

9. An information processing device according to claim 4, further comprising a display control means retrieving for each of the partial areas, information on a key corresponding to a partial area, from the storage means, and superimposing the information on an image displayed in the partial area.

10. An information processing device according to claim 5, further comprising a display control means retrieving for each of the partial areas, information on a key corresponding to a partial area, from the storage means, and superimposing the information on an image displayed in the partial area.

11. An information processing device according to claim 6, further comprising a third identifying means for identifying a partial area in which no window is displayed and a partial area in which only a window with an interaction right is displayed, wherein the display control means retrieves for each of the partial areas excluding the partial areas identified by the third identifying means, information on a key corresponding to a partial area, from the storage means, and superimposes the information on an image displayed in the partial area.

12. An information processing device according to claim 7, further comprising a third identifying means for identifying a partial area in which no window is displayed and a partial area in which only a window with an interaction right is displayed, wherein the display control means retrieves for each of the partial areas excluding the partial areas identified by the third identifying means, information on a key corresponding to a partial area, from the storage means, and superimposes the information on an image displayed in the partial area.

13. An information processing device according to claim 8, further comprising a third identifying means for identifying a partial area in which no window is displayed and a partial area in which only a window with an interaction right is displayed, wherein the display control means retrieves for each of the partial areas excluding the partial areas identified by the third identifying means, information on a key corresponding to a partial area, from the storage means, and superimposes the information on an image displayed in the partial area.

14. An information processing device according to claim 9, further comprising a third identifying means for identifying a partial area in which no window is displayed and a partial area in which only a window with an interaction right is displayed, wherein the display control means retrieves for each of the partial areas excluding the partial areas identified by the third identifying means, information on a key corresponding to a partial area, from the storage means, and superimposes the information on an image displayed in the partial area.

15. An information processing device according to claim 10, further comprising a third identifying means for identifying a partial area in which no window is displayed and a partial area in which only a window with an interaction right is displayed, wherein the display control means retrieves for each of the partial areas excluding the partial areas identified by the third identifying means, information on a key corresponding to a partial area, from the storage means, and superimposes the information on an image displayed in the partial area.

16. An information processing device according to claim 7, wherein the third identifying means identifies a partial area in which no window is displayed, a partial area in which only a window with an interaction right is displayed, and a partial area in which plural windows are displayed.

17. An information processing device according to claim 8, wherein the third identifying means identifies a partial area in which no window is displayed, a partial area in which only a window with an interaction right is displayed, and a partial area in which plural windows are displayed.

18. An information processing device according to claim 9, wherein the third identifying means identifies a partial area in which no window is displayed, a partial area in which only a window with an interaction right is displayed, and a partial area in which plural windows are displayed.

19. An information processing device according to claim 10, wherein the third identifying means identifies a partial area in which no window is displayed, a partial area in which only a window with an interaction right is displayed, and a partial area in which plural windows are displayed.

20. An information processing device according to claim 1, further comprising a lighting means for illuminating a light for each of the plurality of keys, wherein the notification means causes the lighting means to illuminate lights for the keys assigned to the windows by the assigning means, among the plurality of keys.

21. An information processing device according to claim 3, further comprising a lighting means for illuminating a light for each of the plurality of keys, wherein the notification means causes the lighting means to illuminate lights for the keys corresponding to the partial areas identified by the second identifying means, among the plurality of keys.

22. A computer program comprising instructions on a non-transitory computer readable medium, the computer program for causing a computer to execute:
   an identifying step of, if one of a plurality of arranged keys is operated, identifying, with reference to a memory storing for each of partial areas obtained by dividing a display area so that arrangement of the partial areas is identical to arrangement of the plurality of arranged keys, data indicating a range of a partial area and information on a key arranged in a same position as the partial area, a partial area corresponding to the operated key;
   a determining step of determining whether a plurality of windows are displayed in the partial area identified at the identifying step;
   an assigning step of, if it is determined at the determining step that a plurality of windows are displayed, assigning a key to each of the windows displayed in the partial area identified at the identifying step, the key being for selecting the window;
   a notifying step of notifying the keys assigned at the assigning step; and
   a selecting step of, if one of the keys notified at the notifying step is operated, selecting a window to which the operated key has been assigned,
   wherein in the assigning step, the assigned key is different from the key corresponding to the partial area identified at the identifying step.

23. A computer program comprising instructions on a non-transitory computer readable medium, the computer program for causing a computer to execute:
   an identifying step of, if one of a plurality of arranged keys is operated, identifying, with reference to a memory storing for each of partial areas obtained by dividing a display area so that arrangement of the partial areas is identical to arrangement of the plurality of arranged keys, data indicating a range of a partial area and information on a key arranged in a same position as the partial area, a partial area corresponding to the operated key;
   a determining step of determining whether a plurality of windows are displayed in the partial area identified at the identifying step;
   a comparing step of, if it is determined at the determining step that a plurality of windows are displayed, calculating an area of each of the windows displayed in the partial area identified at the identifying step, and comparing the areas with each other;
a selecting step of selecting a window having a largest area, on the basis of a result of the comparison at the comparing step; and
a message providing step of, when no window is displayed in the partial area, providing a user with a message informing that an error in operation has been detected, and urging the user to re-select one of the plurality of keys.

24. A computer program comprising instructions on a non-transitory computer readable medium, the computer program for causing a computer to execute:
   a first identifying step of, if one of a plurality of arranged keys is operated, identifying, with reference to a memory storing for each of partial areas obtained by dividing a display area so that arrangement of the partial areas is identical to arrangement of the plurality of arranged keys, data indicating a range of a partial area and information on a key arranged in a same position as the partial area, a partial area corresponding to the operated key;
   a determining step of determining whether a plurality of windows are displayed in the partial area identified at the first identifying step;
   a second identifying step of, if it is determined at the determining step that a plurality of windows are displayed, identifying a plurality of partial areas in which only one of the windows displayed in the partial area identified at the first identifying step is displayed;
   a notifying step of retrieving information on keys corresponding to the partial areas identified at the second identifying step, from the memory, and notifying the information;
   a selecting step of, if one of the keys notified at the notifying step is operated, identifying a partial area corresponding to the operated key with reference to the memory, and selecting a window displayed in the partial area; and
   a message providing step of, when no window is displayed in the partial area, providing a user with a message informing that an error in operation has been detected, and urging the user to re-select one of the plurality of keys.

25. A computer program comprising instructions on a non-transitory computer readable medium, the computer program for causing a computer to execute:
   an identifying step of, if one of a plurality of arranged keys is operated, identifying, with reference to a memory storing for each of partial areas obtained by dividing a display area so that arrangement of the partial areas is identical to arrangement of the plurality of arranged keys, data indicating a range of a partial area and information on a key arranged in a same position as the partial area, a partial area corresponding to the operated key;
   a determining step of determining whether a plurality of windows are displayed in the partial area identified at the identifying step, and the plurality of windows are displayed in a stack;
   a selecting step of, if it is determined at the determining step that a plurality of windows are displayed in a stack, selecting a window displayed at a forefront among the windows displayed in the partial area in a stack; and
   a message providing step of, when no window is displayed in the partial area, providing a user with a message informing that an error in operation has been detected, and urging the user to re-select one of the plurality of keys.

26. A computer program comprising instructions on a non-transitory computer readable medium, the computer program for causing a computer to execute:
   an identifying step of, if one of a plurality of arranged keys is operated, identifying, with reference to a memory storing for each of partial areas obtained by dividing a display area so that arrangement of the partial areas is identical to arrangement of the plurality of arranged keys, data indicating a range of a partial area and information on a key arranged in a same position as the partial area, a partial area corresponding to the operated key;
   a determining step of determining whether a plurality of windows are displayed in the partial area identified at the identifying step;
   a selecting step of, if it is determined at the determining step that a plurality of windows are displayed, selecting a window whose title area is included in the partial area among the windows displayed in the partial area identified at the identifying step; and
   a message providing step of, when no window is displayed in the partial area, providing a user with a message informing that an error in operation has been detected, and urging the user to re-select one of the plurality of keys.

* * * * *